United States Patent [19]
List et al.

[11] Patent Number: 6,014,987
[45] Date of Patent: Jan. 18, 2000

[54] ANTI-VORTEX BAFFLE ASSEMBLY WITH FILTER FOR A TANK

[75] Inventors: Michael Carl List; Jennifer Erin Kinzy, both of Lancaster, Calif.

[73] Assignee: Lockheed Martin Corporation, Palmdale, Calif.

[21] Appl. No.: 09/075,912

[22] Filed: May 11, 1998

[51] Int. Cl.[7] ............................. B64D 37/20; F15D 1/00
[52] U.S. Cl. .................... 137/549; 137/582; 137/590; 138/39
[58] Field of Search .................... 137/549, 550, 137/582, 590; 138/39, 37

[56] References Cited

U.S. PATENT DOCUMENTS

| | | | |
|---|---|---|---|
| 2,601,894 | 7/1952 | Morse | 137/582 |
| 2,920,648 | 1/1960 | Sheffer | 137/582 |
| 2,946,345 | 1/1960 | Weltmer | 137/590 |
| 3,682,197 | 8/1972 | Snyder | 137/590 |
| 4,553,565 | 11/1985 | Kerebel | 137/590 |
| 4,733,531 | 3/1988 | Grove | 137/590 X |
| 4,743,278 | 5/1988 | Yeh | 55/159 |
| 4,768,541 | 9/1988 | Uney et al. | 137/154 |
| 4,901,762 | 2/1990 | Miller, Jr. et al. | 137/590 |
| 5,279,323 | 1/1994 | Grove et al. | 137/154 |
| 5,293,895 | 3/1994 | Grove et al. | 137/154 |
| 5,790,619 | 8/1998 | Peck | 138/39 X |

*Primary Examiner*—John Rivell
*Attorney, Agent, or Firm*—Robert A. Schruhl

[57] ABSTRACT

The invention is an anti-vortex assembly for mounting at the entrance to the outlet port of a propellant tank. In detail, the anti-vortex assembly includes a hollow cylindrical frame assembly having a longitudinal axis, open top and bottom ends, and top and bottom circular shaped support members connected together by equally spaced vertical support members. A baffle assembly is mounted within the frame assembly and which includes a plurality of perforated baffle plates having first and second ends. The first ends of the baffle plates are joined together at the longitudinal axis of the frame assembly and the second ends are joined to the vertical support members of the frame assembly. A first cylindrical shaped filter assembly is mounted about the frame assembly and a second flat disc shaped filter assembly is mounted over the top opening thereof. Fasteners are used to secure the frame member and the first filter assembly to the tank about the periphery of the outlet port.

10 Claims, 5 Drawing Sheets

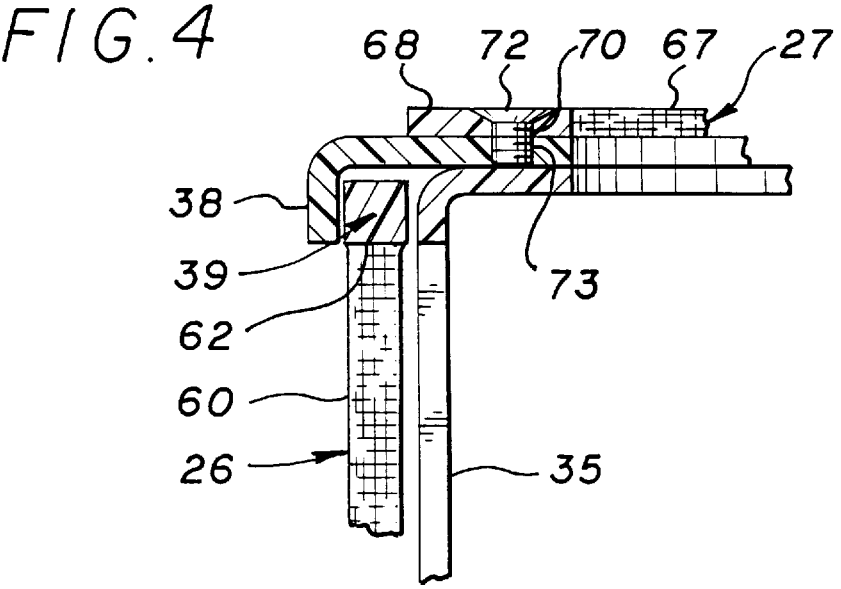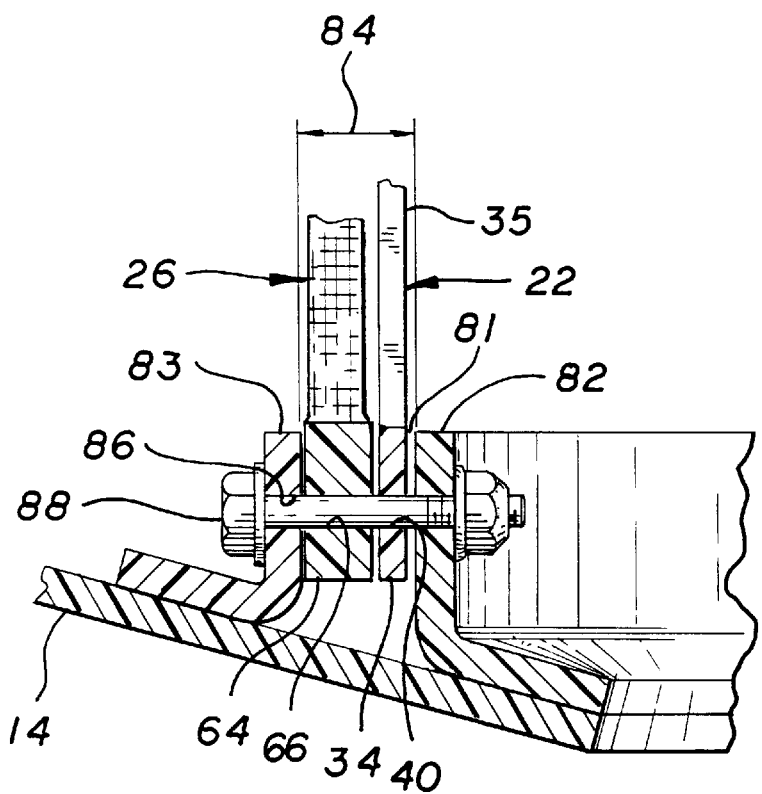

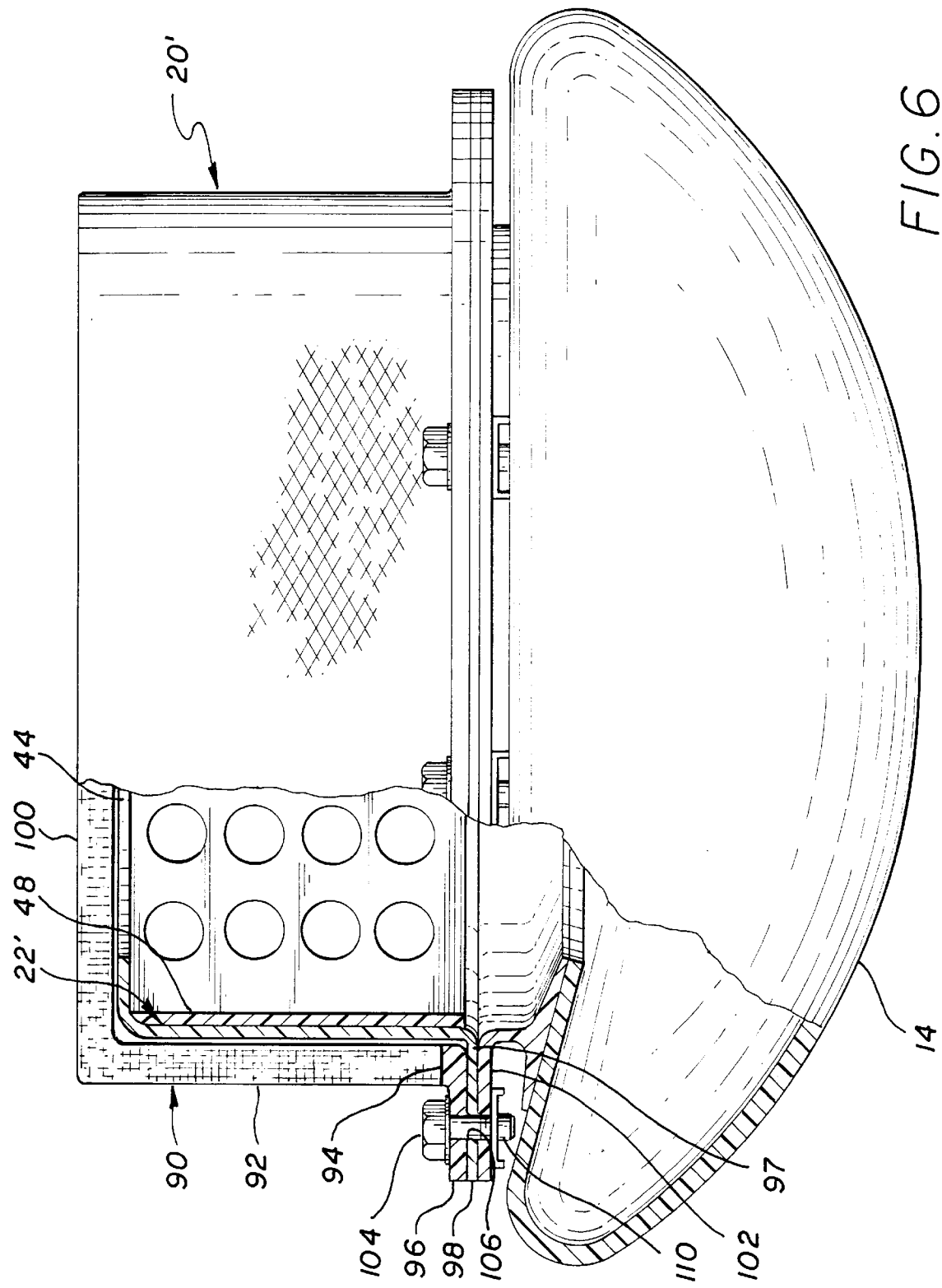

ANTI-VORTEX BAFFLE ASSEMBLY WITH FILTER FOR A TANK

BACKGROUND OF THE INVENTION

The invention described herein was made in the performance of work under NASA Contract No: NCC8-115 and is subject to the provisions of Section 305 of the National Aeronautics and Space Act of 1958 (42 U.S.C. 2457).

1. Field of the Invention

The invention relates to the field of anti-vortex baffle systems for propellant tanks and the like and, in particular, to a combination anti-vortex baffle assembly and filter having a large flow area and simple construction.

2. Description of Related Art

In a vehicle such as a spacecraft booster, it is well known that when propellant is rapidly drained from the tanks, a vortex can sometimes form. This may result in vapor entering into the propellant feed line and possibly into the turbo-pump causing cavitation, which can cause damage thereto or even an explosion. To eliminate this possibility, anti-vortex baffling arrangements are used. For example, in U.S. Pat. No. 2,920,648 "Device To Eliminate Vortices In Fuel Tanks" by R. M. Seffer, a flat disc having "egg-crate" like partitions therein is movably mounted within the tank and travels down the longitudinal axis thereof as it is emptied of propellant. The disadvantages of such a design are obvious: if the tank is large, there is a significant weight penalty; and because it is complicated there is possible reliability issue. In U.S. Pat. No. 2,946,345 "Baffle Structure For Tanks" by W. W. Weltmer, a pyramid shaped structure is located at the bottom of the tank composed of a series of "elbow" shaped vanes. While the structure would work, it is composed of a large number of small parts, making it expensive to manufacture and install.

U.S. Pat. Nos. 5,293,895 and 5,279,323 both titled "Liquid Management Apparatus For Spacecraft" by R. K Grove, et al., disclose a more conventional approach of perforated ribs mounted to the tank wall extending along the longitudinal axis thereof. At the bottom of the tank, the ribs extend radially inward toward the center thereof. A central beam is included that also extends along the longitudinal axis incorporating perforated "cross" shaped ribs. A filter screen is positioned below the ribs covering the outlet port at the bottom of the tank. Here the effect of the baffles is obvious and the screen is of the type that when wetted prevents gas from leaving the tank. However, the structure is heavy and complicated and the filter is not readily accessible for cleaning. Other examples of the use of a screen to prevent gas from entering the propellant feed lines are found in U.S. Pat. No. 4,768,541 "Means Of Expelling Parallel Tanks To Low Residuals" by P. E. Uney, et al. and U.S. Pat. No. 4,743,278 "Passive Propellant Management System" by T. Yeh.

An additional problem is that contamination in the propellant tank may also be drawn into the turbo-pumps causing damage. But most filter designs increase flow resistance, which is highly undesirable. In addition, since most boosters are expendable, the filters in the propellant tanks are not designed for easy access for cleaning, which is a requirement for a reusable launch vehicle.

Thus, it is a primary object of the invention to provide an anti-vortex baffle assembly for a propellant tank.

It is another primary object of the invention to provide an anti-vortex baffle assembly for a propellant tank that incorporates a filter.

It is a further object of the invention to provide an anti-vortex baffle assembly for a propellant tank that incorporates a filter and that does not restrict propellant flow.

It is a still further object of the invention to provide an anti-vortex baffle/filter assembly for a propellant tank that is simple to manufacture.

It is another object of the invention to provide an anti-vortex baffle/filter assembly for a propellant tank incorporating a filter that can be easily removed for repair and cleaning.

SUMMARY OF THE INVENTION

The invention is an anti-vortex baffle assembly for mounting at the entrance to the outlet port of a propellant of the type typically used in a spacecraft launch vehicle or like. In detail, the anti-vortex assembly includes a hollow cylindrical frame assembly open at both its top and bottom ends and having a longitudinal axis and top and bottom circular shaped support members connected together by equally spaced vertical support members. A channel member extends about the external periphery of the top support member of the frame assembly.

A baffle assembly is mounted within the frame assembly that includes a plurality of perforated baffle plates. One end of each of the baffle plates are joined together at the longitudinal axis of the frame assembly with the other end joined to one of the vertical support members of the frame assembly. A first filter assembly that includes a hollow cylindrical filter having top and bottom support members is mounted about the periphery of the frame assembly, such that the top support member is retained by the channel member on the frame assembly. Optionally, the top support member of the frame assembly further includes horizontal support members attached thereto that extend in a radially inward direction and joined together at the longitudinal axis. The top ends of the baffle plates of the baffle assembly are joined to these horizontal support members. A second circular disc shaped filter assembly is secured to the top support member of the frame assembly by means of fasteners. Finally, fastener assemblies secure the frame member and the first filter assembly to the tank about the periphery of the outlet port of the propellant tank.

In a second embodiment, the first cylindrical filter and second flat disc filter are combined into a single "hat" shaped filter that can be placed directly over the frame member and baffle assembly and secured to the tank about the periphery of the outlet port of the propellant tank. This latter embodiment has the advantage of requiring fewer fasteners for assembly as well as fewer parts.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of example. It is to be expressly understood, however, that the drawings are for purposes of illustration and description only and are not intended as a definition of the limits of the invention.

BRIEF DESCRIPTION OF THE DRAWINGS

FIG. 4 is an enlarged partial view of the anti-vortex baffle assembly shown in FIG. 2 particularly illustrating the method of retaining the cylindrical filter assembly to the frame assembly.

FIG. 5 is an enlarged partial view of the anti-vortex baffle assembly shown in FIG. 2 particularly illustrating the method of retaining the cylindrical filter assembly and housing to the tank structure.

FIG. 6 is a partial cross-sectional view of the anti-vortex baffle assembly similar to the one shown in FIG. 2 illustrating a second embodiment.

DESCRIPTION OF THE PREFERRED EMBODIMENT

Figure 1:
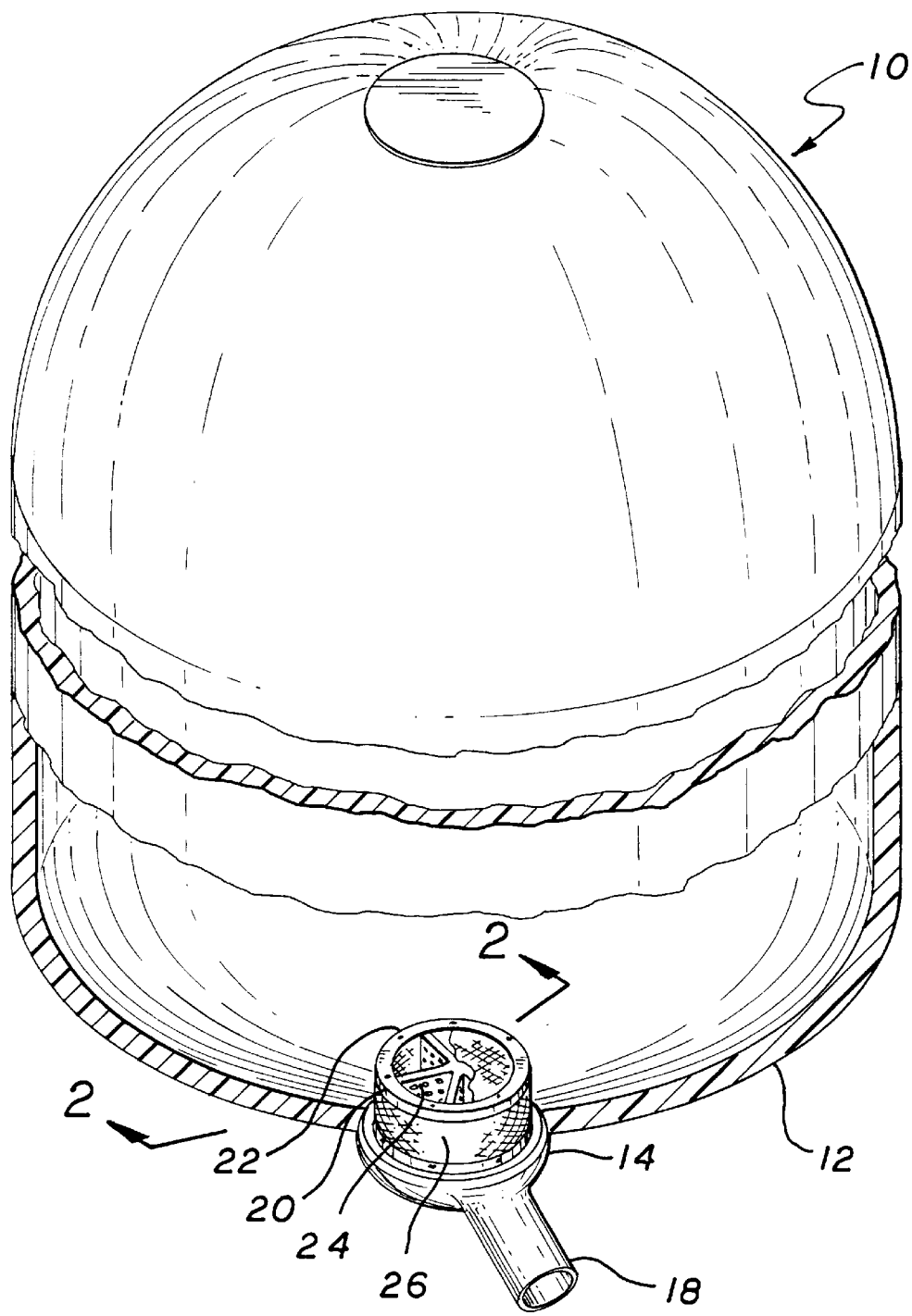
FIG. 1 is a partial perspective view of a propellant tank partially broken away to show the interior thereof, and in particular, the anti-vortex baffle assembly.
Figure 2:
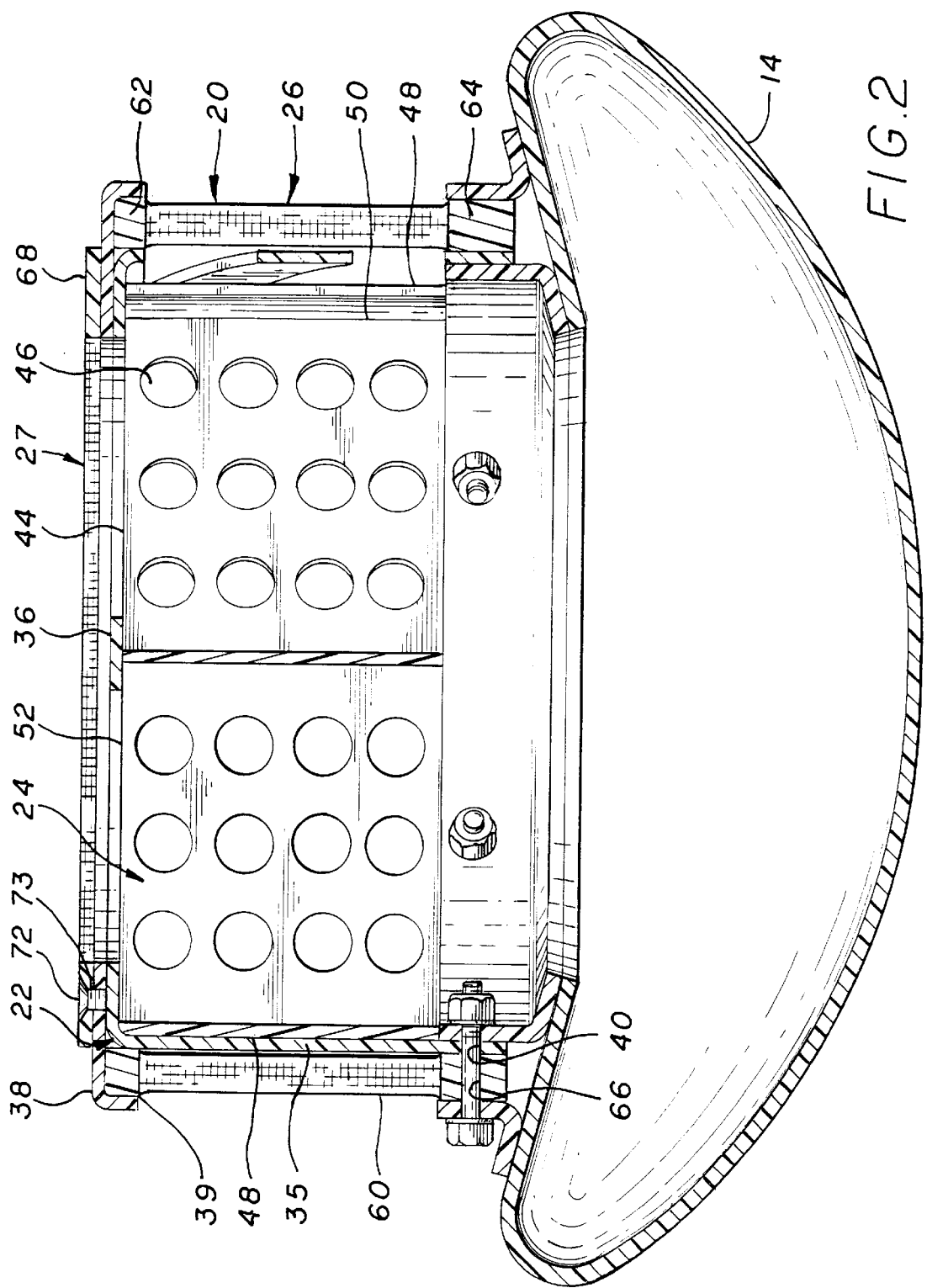
FIG. 2 is a cross-sectional view of the anti-vortex baffle assembly shown in FIG. 1 taken along the line 2—2.
Figure 3:
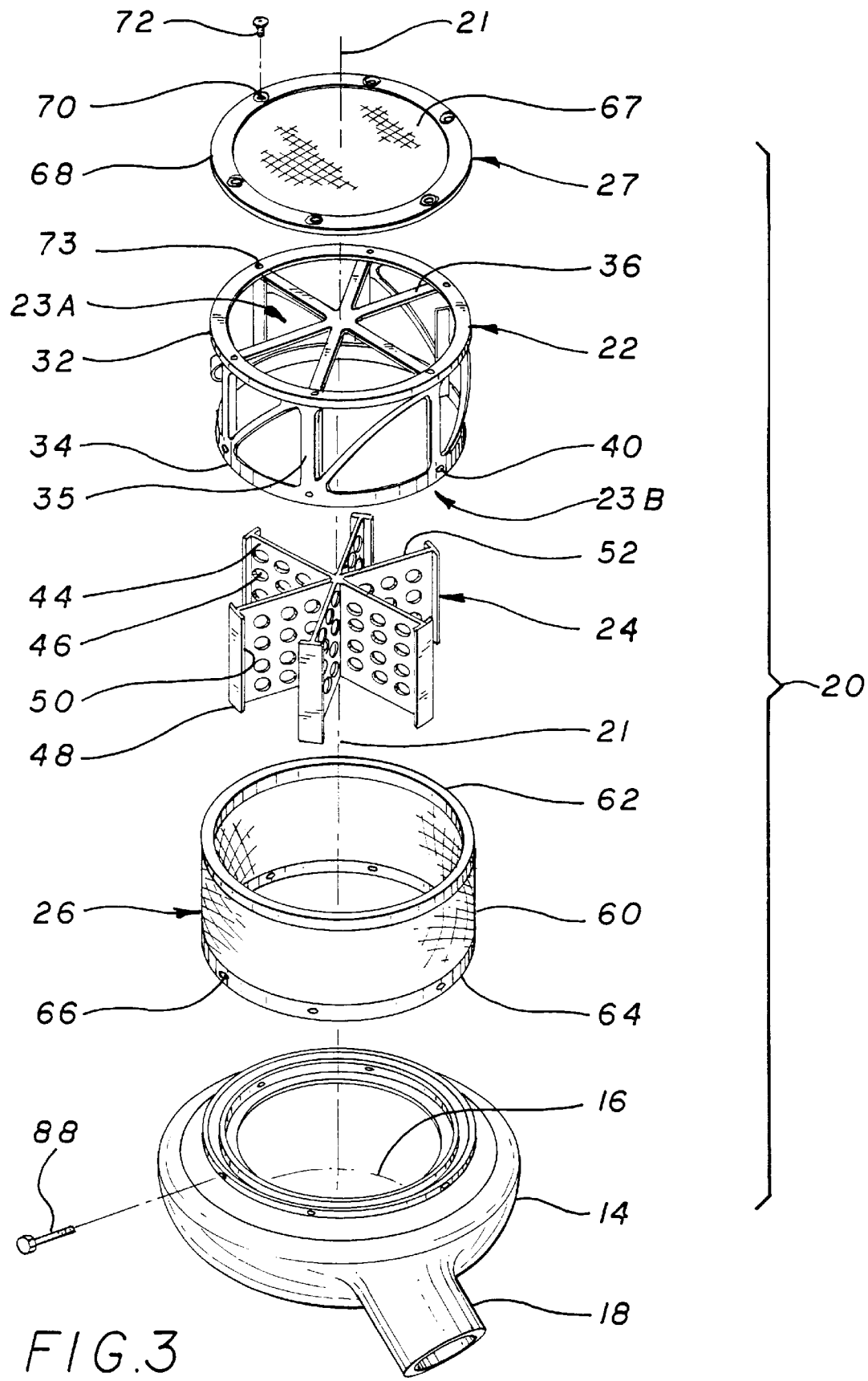
FIG. 3 is an exploded perspective view of the anti-vortex baffle assembly shown in FIG. 1.

Referring to FIGS. 1–3 a propellant tank 10 and various components thereof are illustrated. The propellant tank 10 includes a bottom portion 12 with a outlet fitting 14, incorporating the outlet port 16 (shown in FIG. 2), connected to a propellant feed line 18 that, intern, couples to a turbo-pump of a rocket engine (neither of which are shown). In order to prevent vortexes from being generated, an anti-vortex assembly 20 is positioned over the outlet port 16 and is attached to the outlet fitting 14.

Referring particularly to FIGS. 2 and 3, and additionally to FIG. 4, the anti-vortex assembly 20 has a longitudinal axis 21 and includes a cylindrically shaped frame assembly 22 with open top and bottom end, 23A and 23B, respectively. The frame assembly 22 also includes a baffle assembly 24 mounted therein and a cylindrically shaped filter assembly 26 mounted thereabout and a second circular disc-shaped filter assembly 27 secured to the open top end 23A. In detail, the frame assembly 22 includes top and bottom circular shaped support members 32 and 34, respectively, connected together by equally spaced vertical support members 35. As illustrated there are 6 support members 35 equally spaced 60 degrees from each other; however the number and size of such support members is dependent upon structural strength and flow area requirements. Optionally, the top support member 32 further includes radically inward directed support members 36 that join together at the longitudinal axis 21 of assembly 20. Additionally, the top support member 32 includes a channel member 38 extending about the outer periphery thereof forming a circular shaped slot 39. Fastener holes 40 are located in the lower member members 34 aligned with the vertical support members 35.

The baffle assembly 24 comprises a series of baffle plates 44 that extend radially outward from the longitudinal axis 21 that include a plurality of holes 46. As illustrated there are 6 baffle plates at 60 degrees from each other, and thus are aligned with the vertical support members 35. The baffle plates 44 include end plates 48 that are mounted on at their outer ends 50 thereof that are joined to the vertical support members 35. If incorporated, the support members 36 are joined to the top edges 52 of the baffle plates 44.

The cylindrically shaped filter assembly 26 includes a cylindrical filter 60 having top and bottom support rings 62 and 64, respectively, and is adapted to mount about the outer periphery of the frame assembly 22. The top support member 62 fits within the slot 39 and is retained by the channel member 38 of the frame assembly 22. The bottom support member 64 includes a plurality of fastener holes 66. As illustrated, there are 6 fasteners holes 66, 60 degrees apart that are aligned with the fastener holes 40 in the lower support member 32 of the frame assembly 22. The filter assembly 26 is essentially a circular flat shaped disc filter 67 having a support member 68 about its periphery with six equally space fastener holes 70. Fasteners, in the form of screws 72 secure the filter assembly 27 to the top support member 32 when engaging fastener holes 73 in the frame assembly 22.

Referring to FIG. 5, a circular shaped channel 81 is formed by inner and outer rails 82 and 83, respectively, mounted on the outlet fitting 14. The width of the channel 81, indicated by number 84, is just sufficient to receive the bottom support members 34 and 64 or the frame assembly 22 and filter assembly 26, respectively. The rails 82 and 83 also include a series of fasteners holes 86 equally spaced apart. With the fastener holes 40 of the lower ring of the frame assembly 22, the fastener holes 40 of the filter assembly 26 all aligned with the fastener holes 86, fastener assemblies 88 inserted through these holes secure the anti-baffle assembly 20 to the outlet fitting 14.

In FIG. 6 is a second embodiment of the anti-vortex baffle assembly, indicated by numeral 20', In this embodiment a single "hat" shaped filter assembly 90 replaces the two filter assemblies 26 and 27 (see FIG. 2) and fits over the frame assembly 22'. The filter assembly 90 includes a circular shaped cylindrical filter 92, similar to cylinder 60, and having a circular shaped bottom support member 94 with a circular shaped flange 96 attached thereto. The frame assembly 22' includes a bottom end 97 having a circular shaped flange 98. The top of filer assembly 90 comprises a flat circular shaped filter 100. A circular shaped flange 102 is mounted on the outlet fitting 14 for receiving the flanges 96 and 98. Bolts 104 extend through holes 106 in the flanges 96, 98, and 102, and engages a captive nuts 110 on the flange 102. This method of attachment is preferred because there is no chance that any fastener parts can fall into the propellant feed line 18.

Thus is can be seen that both the anti-vortex assemblies 20 and 20' provide small compact and simple devices for preventing the generation of vortexes at the outlet port, while providing essentially no decrease in flow area. In addition, the filter assemblies being much larger than the outlet port, do not restrict flow. However, it will be effective in preventing any foreign objects such as contamination within the propellant tank 10 from entering the outlet port 16 and possibly damaging the turbo pumps.

While the invention has been described with reference to a particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to spacecraft booster manufacturing industry.

We claim:

1. An anti-vortex assembly for mounting at the entrance to an outlet port of a propellant tank comprising:

a hollow cylindrical frame assembly having a longitudinal axis and open top and bottom ends, said frame assembly having top and bottom circular shaped support members connected together by equally spaced vertical support members;

a baffle assembly mounted within said frame assembly, said baffle assembly comprising a plurality of perforated baffle plates having first and second ends; said first ends joined together at said longitudinal axis of said frame assembly and said second ends joined to said vertical support members of said frame assembly;

a first cylindrical shaped filter assembly mounted about the periphery of said frame assembly;

a second flat disc shaped filter assembly mounted over said top end of said frame assembly and joined thereto; and fastener means for securing said frame assembly and said first filter assembly to the tank about the periphery of the outlet port.

2. The assembly as set forth in claim 1 comprising:

said top support member of said frame assembly includes a channel member extending about the external periphery thereof; and said first filter assembly including a cylindrical filter having top and bottom support members, said top support member retained by said channel member.

3. The anti-vortex baffle assembly as set forth in claim 1 comprising:

said first filter assembly having a top support member attached to said top end thereof extending above said frame assembly; and said second filter assembly attached to said top support member of said first filter assembly.

4. The assembly as set forth in claim 1, or 2, or 3 comprising:

said top support member of said frame assembly further includes horizontal radially inward directed support members joined together at the longitudinal axis thereof, said inward directed support members aligned with said vertical support members; and top ends of said baffle plates of said baffle assembly joined to said horizontal radially inward directed support members.

5. The assembly as set forth in claim 4 comprising:

said bottom end of said frame assembly having a first circular shaped flange;

said bottom end of said first filter assembly including a second circular shaped flange;

a third circular shaped flange mounted on said outlet port adapted to receive said first and second circular flanges on said bottom ends of said frame and first filter assembly; and fastener means comprising:
 a plurality of holes spaced about said first, second and third flanges and extending therethrough;
 captive nuts attached to third flange; and
 bolts extending through said plurality of said holes in said first, second and third flanges and engagable with said captive nuts for securing said first filter assembly and said frame assembly to said outlet port.

6. An anti-vortex assembly for mounting at the entrance to an outlet port of a propellant tank comprising:

a hollow cylindrical frame assembly having a longitudinal axis and open top and bottom ends, said frame assembly having top and bottom circular shaped support members connected together by spaced vertical support members;

a baffle assembly mounted within said frame assembly, said baffle assembly comprising a plurality of perforated baffle plates having first and second ends; said first ends joined together at said longitudinal axis of said frame assembly and said second ends joined to said vertical support members;

a hat shaped filter assembly mounted over said frame assembly, said filter assembly having a first cylindrical shaped filter portion positioned about the periphery of said frame assembly and a second flat disc shaped filter portion positioned over said open top end of said frame assembly; and fastener means for securing said frame assembly and said filter assembly to the tank about the periphery of the outlet port.

7. The assembly as set forth in 6 comprising:

said top support member of said frame assembly further includes horizontal radially inward directed support members that join together at the longitudinal axis thereof, said inward directed support members aligned with said vertical support members; and top ends of said baffle plates of said baffle assembly joined to said horizontal radially inward directed support members of said frame assembly.

8. The assembly as set forth in Claim 7 comprising said vertical and horizontal support members equally spaced from each other about said longitudinal axis.

9. The assembly as set forth in claim 7, or 8, comprising:

said bottom end of said frame assembly having a first circular shaped flange;

said bottom end of said filter assembly including a second circular shaped flange;

a third circular shaped flange mounted on said outlet port adapted to receive said first and second circular flanges on said bottom ends of said frame and filter assembly; and fastener means comprising:
 a plurality of holes spaced about said first, second and third flanges and extending therethrough;
 captive nuts attached to third flange; and
 bolts extending through said plurality of said holes in said first second and third flanges and engagable with said captive nuts for securing said filter assembly and said frame assembly to said tank.

10. The Assembly as set forth in claim 9 comprising:

said top support member of said frame assembly further includes horizontal radially inward directed support members joined together at the longitudinal axis thereof, said inward directed support members aligned with said vertical support members; and top ends of said baffle plates of said baffle assembly joined to said horizontal radially inward directed support members.

\* \* \* \* \*